(12) United States Patent
Goll

(10) Patent No.: US 8,047,766 B2
(45) Date of Patent: Nov. 1, 2011

(54) ELECTROMECHANICAL DRIVE FOR ACTUATING VALVES

(75) Inventor: Armin Goll, Mulfingen (DE)

(73) Assignee: Voith Turbo GmbH & Co., KG, Heidenheim (DE)

( * ) Notice: Subject to any disclaimer, the term of this patent is extended or adjusted under 35 U.S.C. 154(b) by 402 days.

(21) Appl. No.: 12/423,261

(22) Filed: Apr. 14, 2009

(65) Prior Publication Data

US 2009/0263236 A1 Oct. 22, 2009

(30) Foreign Application Priority Data

Apr. 17, 2008 (DE) .................. 10 2008 019 182

(51) Int. Cl.
F04D 1/04 (2006.01)
F04D 5/00 (2006.01)
F04D 17/06 (2006.01)
F04D 29/42 (2006.01)

(52) U.S. Cl. ......... 415/55.1; 415/148; 415/155; 60/348; 60/805

(58) Field of Classification Search .......... 415/13, 415/61, 148, 129, 155, 157 A, 169 R; 60/348, 60/424, 619, 670, 805; 180/301, 304; 122/235.22, 122/248; 251/129.01
See application file for complete search history.

(56) References Cited

U.S. PATENT DOCUMENTS

| | | | | |
|---|---|---|---|---|
| 3,793,905 A | * | 2/1974 | Black et al. ............ | 74/661 |
| 5,899,072 A | * | 5/1999 | Gode ...................... | 60/670 |
| 6,081,082 A | * | 6/2000 | Kim et al. ............... | 318/140 |
| 6,308,513 B1 | * | 10/2001 | Hatanaka ................ | 60/805 |
| 6,434,924 B1 | * | 8/2002 | Lawlor .................... | 60/772 |
| 6,568,191 B2 | * | 5/2003 | Marushima et al. .... | 60/806 |
| 6,584,759 B1 | * | 7/2003 | Heap ...................... | 60/39.44 |
| 6,779,964 B2 | * | 8/2004 | Dial ......................... | 415/1 |
| 6,796,130 B2 | * | 9/2004 | Little et al. ............. | 60/782 |
| 6,924,650 B2 | * | 8/2005 | Haeusermann et al. | 324/546 |
| 7,192,244 B2 | * | 3/2007 | Grande et al. .......... | 415/90 |
| 7,810,322 B2 | * | 10/2010 | Rez ......................... | 60/348 |

FOREIGN PATENT DOCUMENTS

| | | |
|---|---|---|
| DE | 3019602 C2 | 11/1981 |
| DE | 4236846 C2 | 5/1994 |
| DE | 4447309 C2 | 7/1996 |
| DE | 19639307 A1 | 3/1998 |
| DE | 19650947 A1 | 6/1998 |
| DE | 29917083 U1 | 1/2000 |

* cited by examiner

*Primary Examiner* — Chris Chu
(74) *Attorney, Agent, or Firm* — Taylor IP, P.C.

(57) ABSTRACT

The invention relates to an electromechanical drive for actuating valves, especially in steam turbines including an electromotor, a linear unit, a clutch and an electronic control unit. The linear unit includes a piston rod which is guided in a power-transmission thread of a screw nut, and is arranged, at least in sections, as a spindle and is displaceable along its longitudinal axis for actuating the valve in the screw nut with the power-transmission thread. The clutch is arranged for transmitting a rotational movement of the motor axis of the electromotor onto the piston rod. The electronic control unit is set up to control the speed and/or rotor position of the motor axis of the electromotor depending on a control signal and an output signal of a position pick-up of the position of the piston rod in the screw nut with power-transmission thread, and/or to control the engagement and/or disengagement of the clutch depending on the control signal.

20 Claims, 5 Drawing Sheets

ELECTROMECHANICAL DRIVE FOR ACTUATING VALVES

BACKGROUND OF THE INVENTION

1. Field of the Invention

The present invention relates to an electromechanical drive for actuating valves, especially in steam turbines.

2. Description of the Related Art

It is known to open and close valves in steam turbines with hydraulic or pneumatic drives, for example, to actuate an actuator for this purpose with a hydraulic cylinder or pneumatic cylinder in an electrohydraulic or electropneumatic manner. Examples for such actuators are described in German Patent documents DE 30 19 602 C2 and in DE 42 36846 C2.

Electrohydraulic or electropneumatic actuators are used for adjusting steam valves. Such actuators consist of a hydraulic cylinder or pneumatic cylinder which can be arranged in a single-acting or double-acting manner. A hydraulic/pneumatic control valve triggering the same is arranged as a 3/3 or 4/3 directional control valve and a position-sensing and a closed-loop control mechanism for the hydraulic cylinder or pneumatic cylinder. The position-sensing mechanism for the hydraulic cylinder or pneumatic cylinder, which can be arranged as an electronic position sensor or, in the simplest of cases, as a mechanical lever mechanism, is used to guide back the actual position of the hydraulic cylinder/pneumatic cylinder to the hydraulic/pneumatic control valve. A closed-loop position control loop for the hydraulic/pneumatic cylinder can thus be performed which allows a continuous setpoint-value-dependent positioning of the hydraulic/pneumatic cylinder.

One requirement in the adjustment of steam valves is that various fault conditions or events in the steam turbine require the steam valve to be closed reliably and very rapidly in order to bring the steam turbine to a secure state. Such quick-locking processes need to be performed even in the case of failure of the supply of medium of the hydraulic cylinder or pneumatic cylinder, e.g. the oil supply. This leads to the demand to enable performing the closing process independent of any functioning oil supply. Pressure springs are usually applied for this purpose to the actuator or the steam valve which exert the closing force independent of oil supply/air supply. Another solution is to provide the medium pressure reservoir as close as possible to the actuator and to remove the required medium quantity from the same and to exert the closing force.

For the feedback control of such actuators in steam valves in steam turbines, there are special requirements concerning the speed and the low-level signal behavior of such a feedback control. It is thus necessary that in the case of load changes in the steam turbine, as may occur, for example, in a sudden relief of a driven generator, the servo valve needs to move very rapidly to a new lower lifting position which corresponds to the new operating point of the generator and which holds the steam turbine within the permitted speed or frequency limits. If a demand for rapid closing occurs during such a feedback control process, it needs to be performed immediately. A precise low-hysteresis low-level signal behavior is required especially during the synchronization of a driven generator to the electric infeed network because no damping load acts on the steam turbine and thus small changes in the stroke of the actuator on the steam valve will lead to large changes in speed in the steam turbine. These high requirements can hardly be fulfilled with pneumatic drives. That is why they are only used in simpler applications such as steam turbines for compressor or pump drives. Electrohydraulically driven actuators are used otherwise.

The known actuators in steam turbines require a supply with a medium. Especially in the case of hydraulic drives a separate oil supply is usually necessary which supplies the required high medium pressure and oil quantity on the one hand and ensures the required oil purity which is required for operating directional control valves on the other hand. Moreover, complex mechanical piping is necessary which leads the medium to the actuator and from there back to the oil supply. There is always the likelihood of leakages of medium on the actuator and the piping, which is caused by improper piping or by the detachment of connecting elements by vibrations which are always present in steam turbines. These leakages of medium can lead to fires when flammable medium reaches the hot surface of the steam turbine. In order to avoid this, non-flammable medium liquids are used. However, they are expensive, lead to higher maintenance costs, and are hazardous for the environment which is why they have not prevailed as a solution to the problem. A further disadvantage of known actuator technology is that, in the case of electrohydraulic actuators, the mounting position cannot be chosen freely but is regularly predetermined in a fixed fashion, thus limiting the constructional freedom in the arrangement of such drives.

What is needed in the art is an electromechanical drive for actuating valves which avoids the disadvantages of the state of the art, especially by achieving a simple and secure actuation of valves of steam turbines.

SUMMARY OF THE INVENTION

The present invention in one form is directed to an electromechanical drive (actuator) for actuating valves includes an electromotor and a linear unit, with the linear unit having a piston rod which is guided in a screw nut with a power-transmission thread and is arranged, at least in sections, as a spindle, and which his displaceable in the power-transmission thread of the screw nut in its longitudinal axial direction for actuating the valve. Furthermore, a clutch is provided, with the clutch being arranged for transmitting a rotary motion of the motor axis of the electromotor onto the piston rod. An electronic control unit of the electromechanical drive in accordance with the present invention is arranged to control the speed and/or the rotor position of the motor axis of the electromotor depending on a control signal and an output signal of a position pick-up of the position of the piston rod in the screw nut with a power-transmission thread and/or to control the engagement or disengagement of the clutch depending on the control signal.

The rotational movement of the motor axis of the electromotor is transferred by way of the linear unit into a displacement of the piston rod in the direction of its longitudinal axis. This displacement is used for actuating the valve. The piston rod is guided with its section arranged as a spindle (spindle section) in the screw nut with power-transmission thread. The spindle section is guided in a spindle nut. A power-transmission thread shall be understood as being a substantially non-self-inhibiting thread, so that by exerting a force in the direction of the longitudinal axis of the piston rod on the piston rod it will rotate in the screw nut with power-transmission thread or the spindle nut will rotate about the piston rod with a respective drive.

In a mounted state of the drive in accordance with an embodiment of the present invention, the spindle nut is positioned in a stationary manner relative to the valve to be actuated, so that the forces occurring during the actuation of the valve can be absorbed. By disengaging the clutch, quick-action closing of the valve is facilitated because no force needs to be exerted for co-rotation of the motor axis of the electromotor during the quick-action closing. By controlling and/or adjusting the rotor position of the motor axis of the electromotor, the position of the piston rod, and thus a valve opening, can be set precisely. The position pick-up is used to determine the position of the piston rod, which allows feedback for monitoring the control. The position pick-up can be arranged as any component, such as a sensor, having an output signal from which the position of the piston of the piston rod can be calculated and/or derived by an indirect method.

The actuator in accordance with the present invention can be used especially for actuating lift valves, preferably steam valves in steam turbines. The actuator can be used to actuate valves in steam engines with a purely electromechanical drive. Hydraulic and pneumatic supply can thus be omitted. The drive contains all required components and functions in order to fulfill the special requirements which are given in the actuation of valves in steam turbines. This opens the possibility to simply replace existing hydraulic or pneumatic drives by maintaining the usual functionalities and interfaces. The electromechanical actuator according to the present invention for steam valves avoids the disadvantages of known actuators for steam valves, with all necessary requirements placed on an actuator for steam valves being maintained. The electromechanical drive in accordance with the invention merely requires electric power for its operation and can be arranged as a very compact arrangement which contains all elements that are necessary for performing the function necessary for an actuator unit of a steam valve.

An especially smooth-running linear unit can be achieved in such a way that the power-transmission thread is arranged as a recirculating ball screw or tapered-roll spindle drive, or ACME screw.

Preferably, the linear unit includes an energy-storing spring, with the energy-storing spring supporting the displacement of the piston rod in the screw not with the power-transmission thread in a direction of the closing of the valve.

When the linear unit includes at least one shock absorber for absorbing the kinetic energy of the piston rod during a displacement of the piston rod in the direction of the closing valve, damage to the linear unit during a quick-action closing process can be avoided.

A transmission for power transmission from the motor axis to the piston rod is provided advantageously between the motor axis of the electromotor and the piston rod, through which torque transmission of the power-transmission is enabled.

When the clutch is arranged between the transmission and the piston rod, the transmission can be disengaged simultaneously during the quick-action closing process.

The transmission further ensures that the motor axis and the piston rod can be arranged next to one another in parallel in a spatial respect, through which a very compact arrangement of the electromechanical drive in accordance with the present invention is achieved.

Preferably, the position pick-up of the position of the piston rod includes a linear displacement transducer in the linear unit which is arranged for measuring the position of the piston rod in the screw nut with power-transmission thread. The position of the piston rod and thus the valve opening position of the valve to be actuated can thus be measured directly, leading to a very reliable adjustment of the speed and/or the rotor position of the electromotor. Alternatively or additionally, the position pick-up can include a speed or rotor-position sensor of the electromotor. The speed and rotor-position sensor can be arranged, for example, as incremental position transducer or resolver. When the rotor position of the electromotor and its speed are known, the position of the piston rod can easily be calculated from the same.

A simple and robust control of the speed and/or the rotor position of the electromotor is enabled when the control unit includes a frequency converter. The frequency converter is dimensioned in such a way that the desired control is achieved. A spherical bearing fixture for connection with a valve to be actuated is advantageously provided at the free end of the piston rod. The piston rod then need not be aligned in true alignment with the valve.

BRIEF DESCRIPTION OF THE DRAWINGS

The invention will be explained below in closer detail by way of example by reference to embodiments and the enclosed drawings wherein.

The figures of the drawings show the subject matter of the invention in a highly schematic way and shall not be understood to be true to scale. The individual components of the subject matter of the invention are shown in such a way that its structure can be displayed favorably.

DETAILED DESCRIPTION OF THE INVENTION

Figure 1:
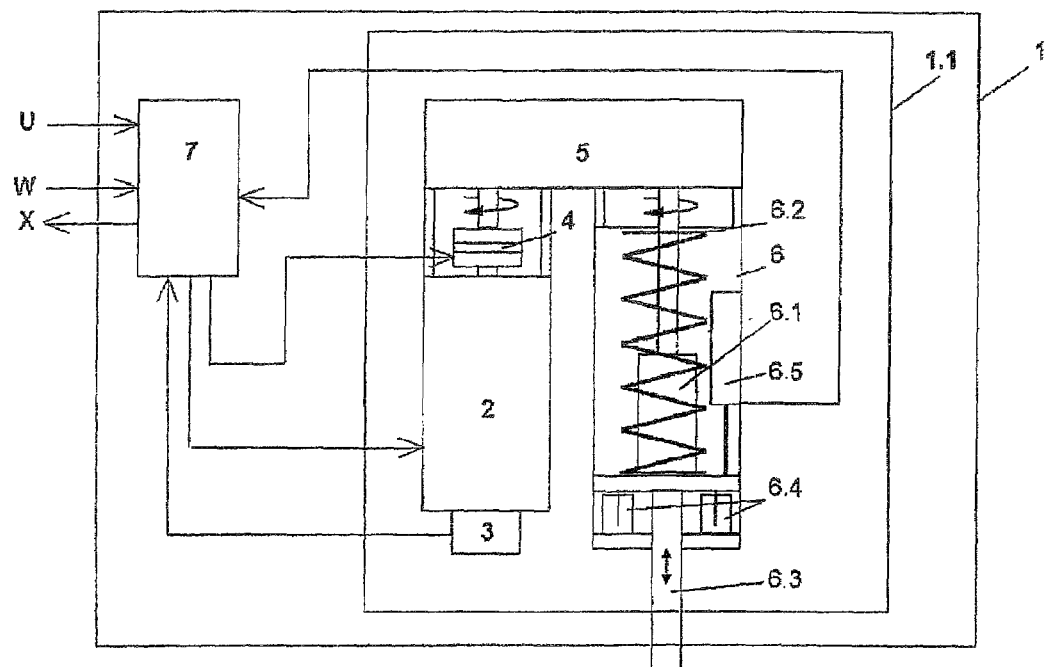
FIG. 1 shows an embodiment of an electromechanical drive in accordance with the present invention.

Referring now to the drawings, and more specifically to FIG. 1, there is shown a schematic illustration of an electromechanical drive 1 in accordance with an embodiment of the present invention for actuating a valve of a steam turbine, not shown in the drawing. Drive 1 includes an electromechanical actuating unit 1.1 and a control unit 7 which is arranged as a frequency converter. An electromotor 2, which is preferably arranged as a permanently excited synchronous or asynchronous motor, is triggered by way of control unit 7. Feedback for adjusting the position and the speed of the motor axis of electromotor 2 with control unit 7 is enabled by way of a speed and rotor-position sensor 3, which can be arranged as an incremental position transducer or as a resolver.

A torque exerted by the electromotor is transmitted by a gearing 5, which can be arranged as a two-stage belt drive or a toothed gear onto piston rod 6.3 of linear unit 6. Gearing 5 is simultaneously used as a housing for taking up any occurring forces. A clutch 4 which is arranged as an electromechanical tooth clutch or friction clutch is switched between the motor axis of electromotor 2 and gearing 5. Any engagement and/or disengagement of clutch 4 is controlled depending on a control signal by control unit 7. Piston 6.3 includes a section arranged as a spindle, with which it is guided in a screw nut 6.1 with a power-transmission thread, which thread is arranged as a recirculating ball screw, tapered-roll spindle drive, or ACME screw. When electromotor 2 is triggered by control unit 7 so that its motor axis will rotate, piston rod 6.3 will rotate in the engaged state of clutch 4 and is screwed into or out of screw nut 6.1 with power-transmission thread in such a way that a free end of piston rod 6.3 protruding from the drive is extended or retracted. The latter is symbolized in the drawing by the double arrow indicated on piston rod 6.3.

An energy-storing spring 6.2 is arranged about piston rod 6.3 such that piston rod 6.3 is pressed away from gearing 5 so that it causes an extension of piston rod 6.3 with free turning capacity. A force needs to be exerted by electromotor 2 against energy-storing spring 6.2 in order to retract piston rod 6.3. An automatic extension of piston rod 6.3 can be achieved by energy-storing spring 6.2 after a disengagement of clutch 4, which leads to a quick-action closing of a valve. The valve, which is a steam valve for example, is coupled to the free end of piston rod 6.3 in operation of drive 1 in accordance with the present invention. Shock absorbers 6.4 are provided in linear unit 6 for damping a stop of piston rod 6.3 during its bearing in linear unit 6 in the case of such a quick-action closing.

Linear unit 6 further includes a linear displacement transducer 6.5 by which the position of piston rod 6.3 is measured directly in screw nut 6.1 with power-transmission thread, i.e. the extension and retraction position of the piston rod 6.3. An output signal containing information on the position of piston rod 6.3 is forward to control unit 7, thus enabling further feedback for controlling the speed and rotor position of electromotor 2.

Piston rod 6.3 is moved linearly up and down for actuating a valve flanged onto the free end of piston rod 6.3. The linear movement is converted in linear unit 6 by a ball screw into a rotational movement. The rotational movement is translated by gearing 5 and guided to electromotor 2. A speed and rotor position sensor 3 is connected to electromotor 2. Sensor 3 measures the speed and the rotor position of the electromotor 2 and sends this information to frequency converter 7. Frequency converter 7 process the sensor information and adjusts the torque, speed, and position of electromotor 2. It is connected to an electric network U from where it obtains its power. Furthermore, it is provided externally with a setpoint value W which is representative of the information on the desired position of piston rod 6.3, and it supplies on its part externally an actual value X which is representative of the current position of the piston rod 6.3. Setpoint 2 and actual value signal X are normalized to the same value, so that diagnosis and monitoring of the drive is facilitated. Setpoint W and actual value signal X are arranged as a 4-20 mA normalized signals. Setpoint value W and actual value X can also be sent by way of a field bus to control unit or frequency converter 7.

A positioning controller for adjusting the position of piston rod 6.3 is integrated in frequency converter 7. For this purpose, it is provided with information on the current position of piston rod 6.3 from linear displacement transducer 6.5 and/or speed and rotor position sensor 3 and compares it with setpoint value W. The output correcting variable of the positioning controller is sent as a setpoint value to a subordinate speed controller which receives its actual value from speed and rotor position sensor 3. The output of the speed controller is sent as a setpoint value on its part to a subordinate torque controller which receives its actual value from the converted phase currents of electromotor 2.

Electromotor 2 supplies its torque and its speed to electromechanical tooth clutch or friction clutch 4, which forwards the torque and the speed to the drive side of gearing 5, when closed by a triggering signal from frequency converter 7. Clutch 4 is preferably arranged in such a way that it is closed by an electric signal and opens in a spring-actuated manner once the electric triggering signal is cut off. It is also possible to provide an opposite action of clutch 4, such that clutch 4 is opened with the electric control signal and clutch 4 is closed by an integrated spring force of spring 6.2. The clutch closing function is performed by an electromagnetic coil. This coil is supplied by frequency converter 7 with current. In order to save energy and keep the heating of the coil as low as possible, it is operated in a current-clocking manner after the attraction process.

Clutch 4 is also used to trigger the quick-action closing process (tripping process) of drive 1. For this purpose, the rotating mass of electromotor 2 is separated from the remaining part of the drive, thus ensuring a substantially faster closing process. After the closing process, clutch 4 is closed again and drive 1 can assume its normal positioning function again. When clutch 4 is opened, the force and the power for the closing function come from energy-storing spring 6.2. It then drives gearing 5 reversely from the driven side. Advantageously, clutch 4 sits on the drive side of gearing 5 because the overall size of clutch 4 is then smaller as a result of the lower amount of torque to be transmitted and a smaller clutch can be opened faster than a large clutch. It is also possible to provide an arrangement on the driven side of clutch 4 or an arrangement in the gearing between the individual gearing steps. An arrangement on the driven side comes with the advantage that energy storing spring 6.2 need not additionally accelerate gearing 5 during the closing process.

Gearing 5 is used on the one hand for torque and speed translation, and on the other hand, it represents the central housing element which takes up the forces of electromotor 2 and linear unit 6 and allows an especially compact configuration of drive 1 as a result of its arrangement which enables a spatially parallel arrangement of electromotor 2 and linear unit 6 and the motor axis of electromotor 2 and piston rod 6.3.

Linear unit 6 includes screw nut 6.1 with power-transmission thread which is preferably arranged as a ball screw unit, energy storing spring 6.2, piston rod 6.3, shock absorbers 6.4, and the linear displacement transducer 6.5. It is the task of linear unit 6 to convert the rotational movement of the spindle of the driven side of gearing 5 as produced by electromotor 2 into a translational movement. A recirculating ball screw is preferably used for this purpose, in which the spindle rotates and the ball nut is fixed in a rotational sense and moves linearly. The reverse case is also possible, in which the ball nut is driven rotationally and the spindle is rotationally fixed and moves linearly. Energy storing spring 6.2 is preferably integrated in linear unit 6, with spring 6.2 being used as a force and energy storage device, which enables a quick-action closing without the help of electromotor 2.

Moreover, the shock absorbers 6.4 are integrated in linear unit 6. It is used to dampen the impact of piston rod 6.3 on the mechanical limit stop of the drive or the valve seat of the steam valve and enable the careful reduction of the kinetic energy that was released by the closing process without mechanically overloading linear unit 6. Shock absorbers 6.4 provide a speed-dependent braking function which upon standstill does not develop any remaining force, so that energy-storing spring 6.2 will press with its pretension in the closed state on the steam valve seat and keep the steam valve closed against any possibly occurring steam power.

Figure 2:
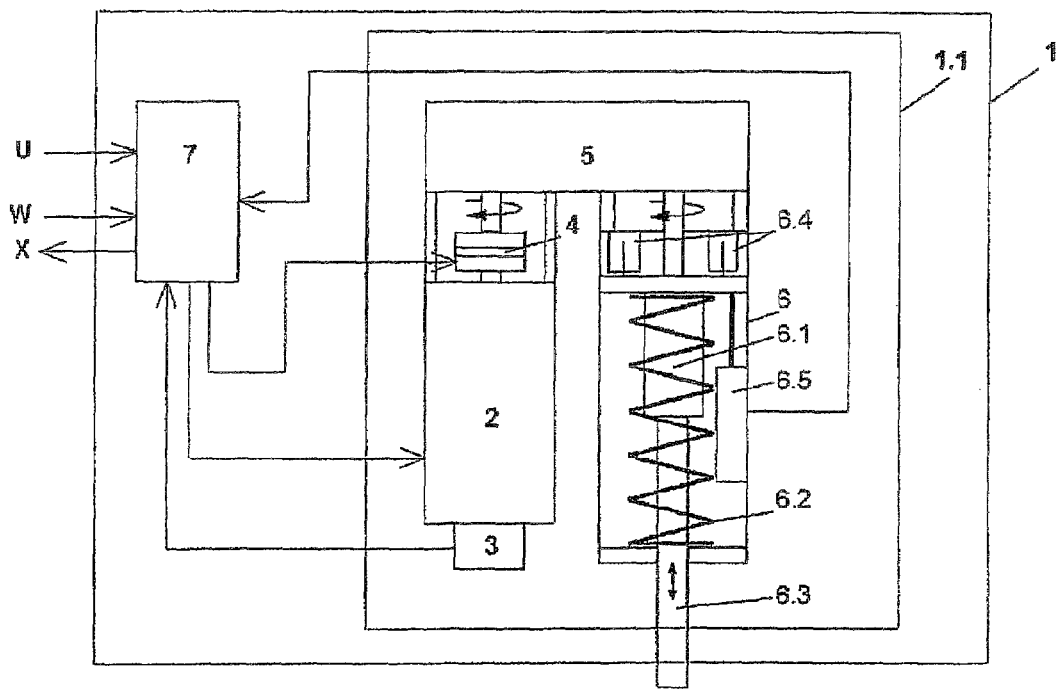
FIG. 2 shows an embodiment of an electromechanical drive in accordance with the present invention in an extending configuration which, in the case of quick-action closure, closes a steam valve by a retracting direction of movement.

Now, additionally referring to FIG. 2, there is shown an embodiment of an electromechanical drive 1 in accordance with the present invention in an extending configuration, which in the case of a quick-action closing, closing a steam valve (not shown) by a retraction direction of movement. In contrast to FIG. 1, the displacement of piston rod 6.3 is supported by energy-storing spring 6.2 in such a way that energy-storing spring 6.2 supports piston rod 6.3 in its retracting direction, which means that the free end of piston rod 6.3 is pulled by spring force of energy-storing spring 6.2 in the inside direction of drive 1. Accordingly, shock absorbers 6.4 are positioned to be adjacent to gearing 5.

Figure 3:
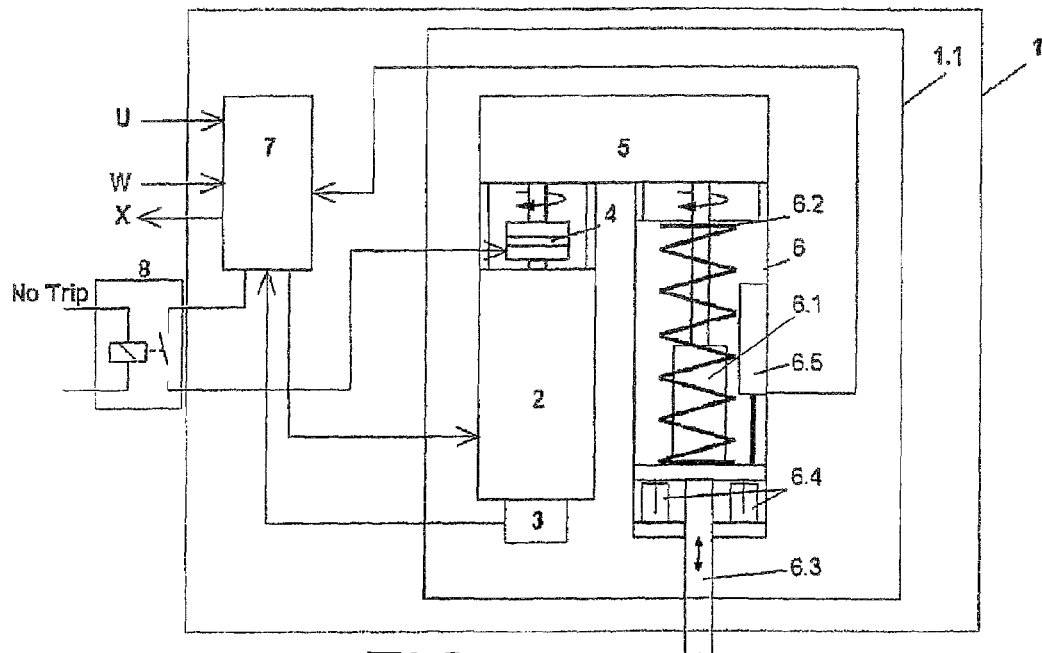
FIG. 3 shows a further embodiment of an electromechanical drive in accordance with the present invention according to FIG. 1, including an external switching device for triggering a clutch.

Now, additionally referring to FIG. 3, there is shown an embodiment of an electromechanical drive 1 in accordance with the present invention according to FIG. 1, with an external switching device 8 being provided in order to trigger clutch 4. External switching device 8 can force a quick-action closing process by opening clutch 4 externally, without using frequency converter 7. The two components of frequency converter 7 and external switching device 8 can be regarded together as a control unit.

Figure 4:
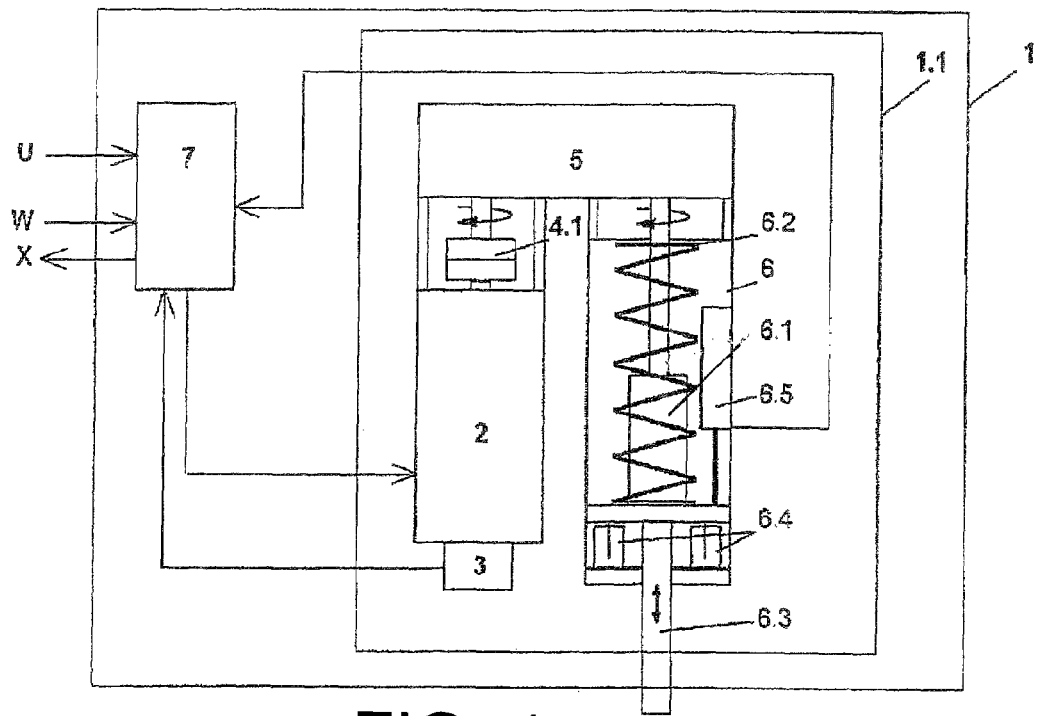
FIG. 4 shows a further embodiment of an electromechanical drive in accordance with the present invention according to FIG. 1, including a mechanical connecting clutch instead of the electrically operated clutch.

Now, additionally referring to FIG. 4, there is shown a further embodiment of an electromechanical drive 1 in accordance with the present invention according to FIG. 1, with a mechanical connecting clutch 4.1 being used instead of the electrically actuated clutch 4.

Figure 5:
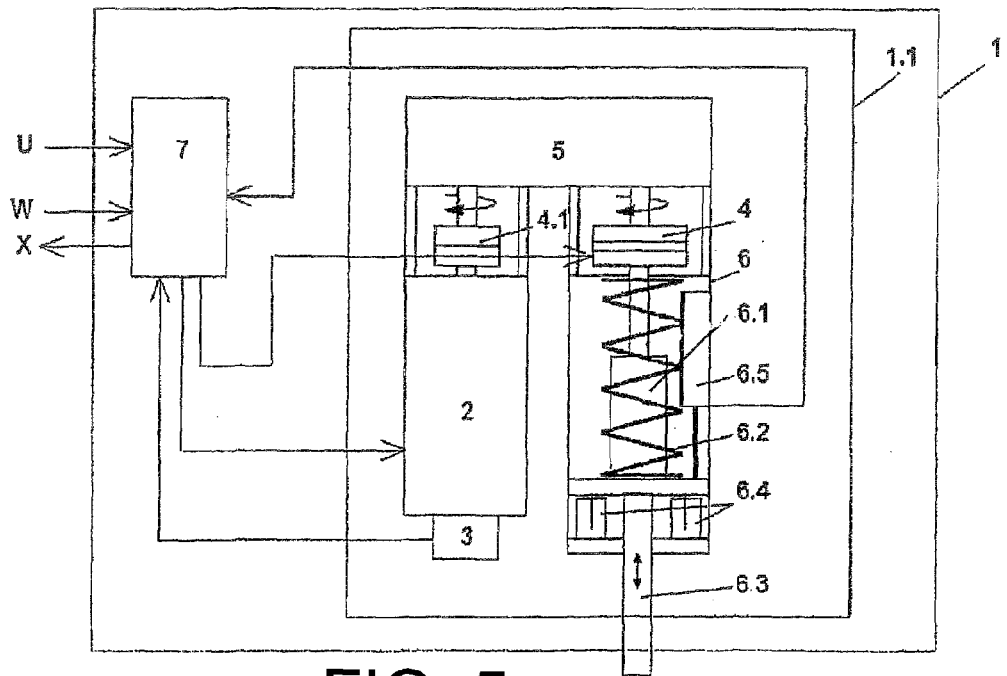
FIG. 5 shows a further embodiment of an electromechanical drive in accordance with the present invention according to FIG. 4, including an electrically operated clutch in addition to the mechanical connecting clutch.

Now, additionally referring to FIG. 5, there is shown an embodiment of an electromechanical drive according to FIG. 4, with an electromechanical clutch 4 being arranged in addition to mechanical connecting clutch 4.1 on the driven side of gearing 5, i.e., between gearing 5 and piston rod 6.3, which clutch can be engaged and disengaged by frequency converter 7.

Figure 6:
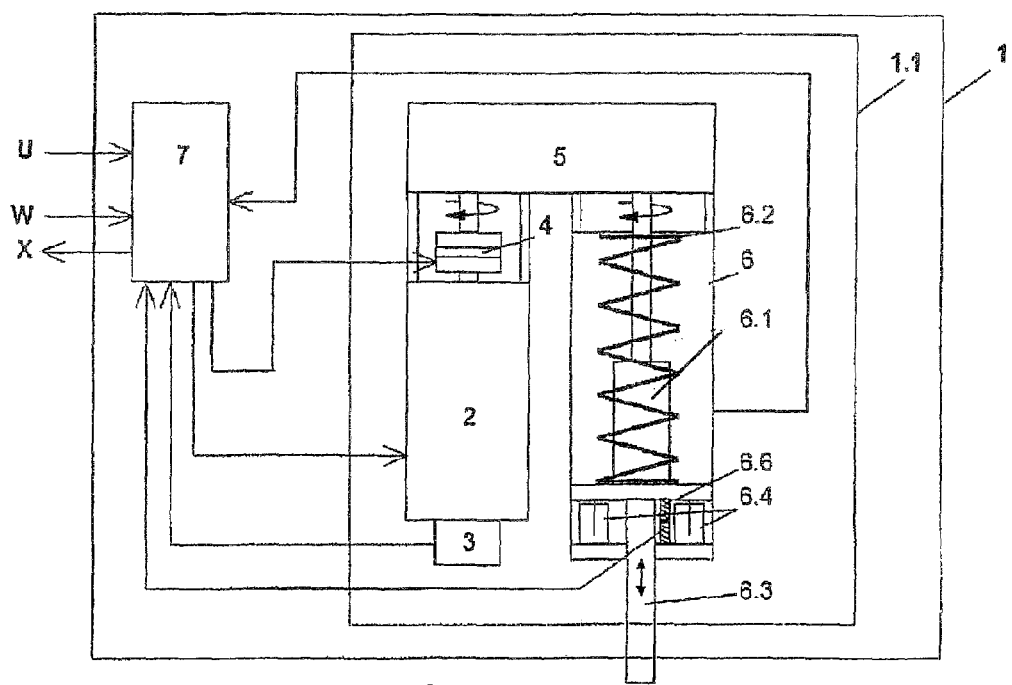
FIG. 6 shows a further embodiment of an electromechanical drive in accordance with the present invention according to FIG. 1, including a position switch instead of a linear displacement transducer.

Now, additionally referring to FIG. 6, there is shown a further embodiment of an electromechanical drive 1 according to the present invention according to FIG. 1, with a position switch 6.6 being provided instead of the linear displacement transducer. Position switch 6.6 is arranged, for example, as a mechanical switch, proximity switch, or reed switch. Speed and rotor position sensor 3 can be used for position measurement in order to enable precise position feedback control of piston rod 6.3. The linear position of the piston rod 6.3 is determined with the help of speed and rotor position sensor 3 and the position controller is fed and operated with the same. The installation of position switch 6.6 is used for measuring the position of the drive, i.e., piston rod 6.3, in order to query a security position.

Generally, electromechanical drive 1 can also include an externally added linear displacement transducer which in this case is not a part of the electromechanical drive per se, but supplies the same with the signal on the current lifting position, i.e., provides information, at least indirectly, on the position of piston rod 6.3.

Figure 7:
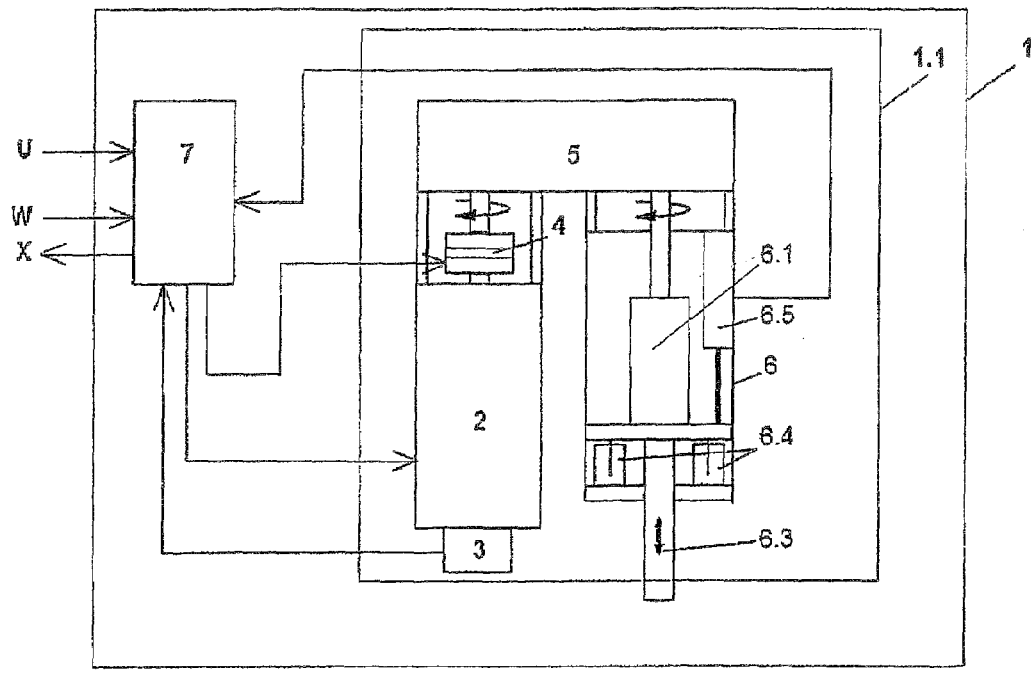
FIG. 7 shows a further embodiment of an electromechanical drive in accordance with the present invention according to FIG. 1 without any energy-storing spring.

Now, additionally referring to FIG. 7, there is shown a further embodiment of an electromechanical drive 1 in accordance with the present invention according to FIG. 1, with no energy-storing spring being present in linear unit 6.

Figure 8:
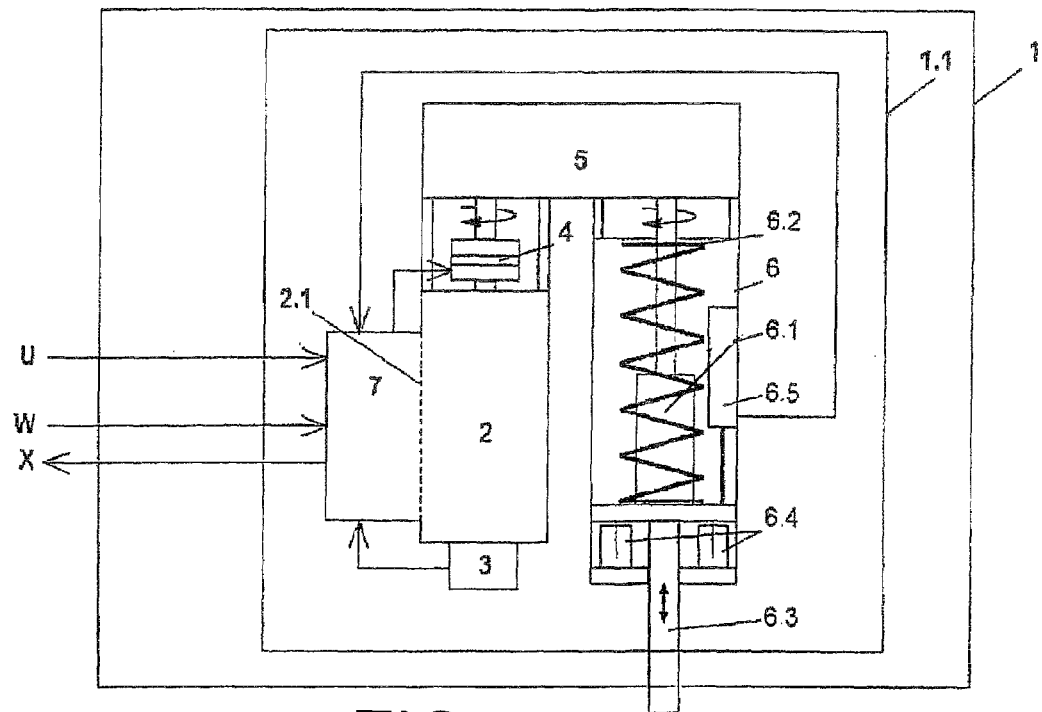
FIG. 8 shows a further embodiment of an electromechanical drive in accordance with the present invention according to FIG. 1, including a frequency converter and a compact module enclosing the electromotor.

Now, additionally referring to FIG. 8, there is shown a further embodiment of an electromechanical drive 1 in accordance with the present invention according to FIG. 1, with frequency converter 7 and electromotor 2 being integrated into a compact module 2.1.

Figure 9:
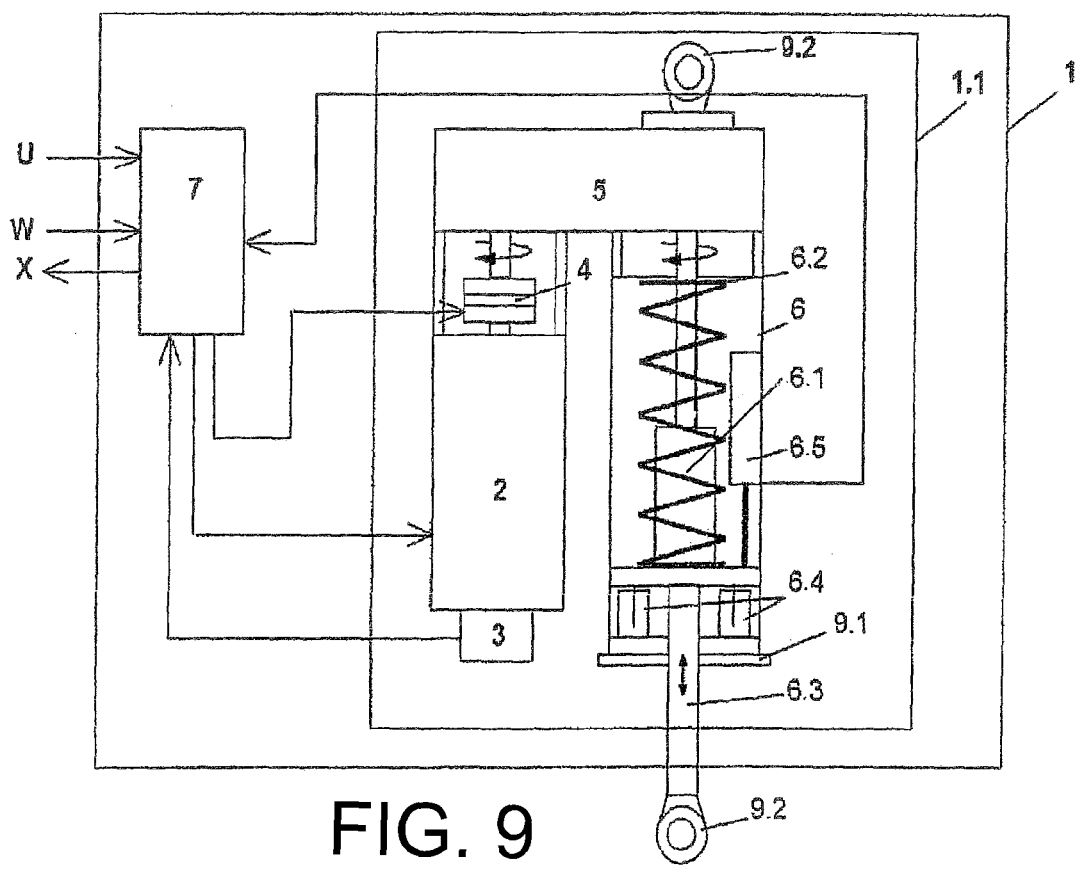
FIG. 9 shows a further embodiment of an electromechanical drive in accordance with the present invention according to FIG. 1, including a spherical bearing fixture.

Now, additionally referring to FIG. 9, there is shown a further embodiment of electromechanical drive 1 in accordance with the present invention according to FIG. 1. Spherical bearing fixtures 9.2 are provided on linear unit 6. One of spherical bearing fixtures 9.2 is provided at the free end of piston rod 6.3 for fastening to a steam valve. The spherical bearing fixtures 9.2 at the free end of piston rod 6.3 may replace the simple flange fixture of the piston rod to the valve. The spatially parallel arrangement of electromotor 2 and linear unit 6 enable this simple variation of the types of attachment of the electromechanical drive unit 1 to a steam valve arrangement either with flange fixture or with spherical bearing fixture 9.2.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 Electromechanical drive for actuating valves on steam turbines
1.1 Electromechanical actuator
2 Electromotor
3 Speed and rotor position sensor
4 Clutch
4.1 Mechanical clutch
5 Gearing
6 Linear unit
6.1 Screw nut with power-transmission thread
6.2 Energy-storing spring
6.3 Piston rod
6.4 Shock absorbers
6.5 Linear displacement transducer
6.6 Position switch
7 Frequency converter/control unit
8 External switching device
9.2 Spherical bearing
U Electrical network
w Setpoint value
X Actual value of position of piston rod 6.3

What is claimed is:
1. An electromechanical drive for actuating a valve of a steam turbine, the electromechanical drive comprising:
an electromotor having a rotor with a motor axis;
a linear unit including:
a screw nut having a power-transmission thread;
a piston rod engaged by said power-transmission thread, said piston rod being arranged in at least one section as a spindle, said piston rod having a longitudinal axis, said piston rod being displaceable in a longitudinal direction along said longitudinal axis;
a clutch arranged for transmitting a rotational movement of said rotor about said motor axis onto said piston rod;

a position pick-up configured to produce an output signal representative of a position of said piston rod in said screw nut; and
an electronic control unit configured to control at least one of:
   at least one of a speed and a rotor position of said rotor about said motor axis dependent upon said output signal and a control signal; and
   at least one of an engagement of said clutch and a disengagement of said clutch dependent upon said control signal.

2. The electromechanical drive of claim 1, wherein said power-transmission thread is one of a ball screw, a tapered-roll spindle drive and an ACME screw.

3. The electromechanical drive of claim 1, wherein said linear unit further comprises an energy-storing spring, said energy-storing spring supporting the displacement of said piston rod in said screw nut in a direction of valve closing.

4. The electromechanical drive of claim 3, wherein said linear unit further comprises at least one shock absorber positioned and configured for absorbing kinetic energy of said piston rod during a displacement of said piston rod in the direction of valve closing.

5. The electromechanical drive of claim 1, further comprising a gearing arranged to transmit power from said motor axis to said piston rod, said gearing being operatively between said motor axis of said electromotor and said piston rod.

6. The electromechanical drive of claim 5, wherein said clutch is arranged between said gearing and said piston rod.

7. The electromechanical drive of claim 5, wherein said motor axis and said piston rod are arranged in a spatially parallel manner next to one another.

8. The electromechanical drive of claim 7, wherein said position pick-up of the position of said piston rod includes at least one of a linear displacement transducer in said linear unit and a sensor, said transducer being configured to measure the position of said piston rod in said screw nut, said sensor being configured to detect at least one of speed and position of said rotor of said electromotor.

9. The electromechanical drive of claim 1, wherein said control unit includes a frequency converter.

10. The electromechanical drive of claim 1, further comprising a spherical bearing fixture connected with the valve to be actuated, said spherical bearing fixture being at a free end of said piston rod.

11. A steam turbine with an electromechanical drive for actuating a valve of a steam turbine, the electromechanical drive comprising:
   an electromotor having a rotor with a motor axis;
   a linear unit including:
      a screw nut having a power-transmission thread;
      a piston rod engaged by said power-transmission thread, said piston rod being arranged in at least one section as a spindle, said piston rod having a longitudinal axis, said piston rod being displaceable in a longitudinal direction along said longitudinal axis;
   a clutch arranged for transmitting a rotational movement of said rotor about said motor axis onto said piston rod;
   a position pick-up configured to produce an output signal representative of a position of said piston rod in said screw nut; and
   an electronic control unit configured to control at least one of:
      at least one of a speed and a rotor position of said rotor about said motor axis dependent upon said output signal and a control signal; and
      at least one of an engagement of said clutch and a disengagement of said clutch dependent upon said control signal.

12. The steam turbine of claim 11, wherein said power-transmission thread is one of a ball screw, a tapered-roll spindle drive and an ACME screw.

13. The steam turbine of claim 11, wherein said linear unit further comprises an energy-storing spring, said energy-storing spring supporting the displacement of said piston rod in said screw nut in a direction of valve closing.

14. The steam turbine of claim 13, wherein said linear unit further comprises at least one shock absorber positioned and configured for absorbing kinetic energy of said piston rod during a displacement of said piston rod in the direction of valve closing.

15. The steam turbine of claim 11, wherein the electromechanical drive further comprises a gearing arranged to transmit power from said motor axis to said piston rod, said gearing being operatively between said motor axis of said electromotor and said piston rod.

16. The steam turbine of claim 15, wherein said clutch is arranged between said gearing and said piston rod.

17. The steam turbine of claim 15, wherein said motor axis and said piston rod are arranged in a spatially parallel manner next to one another.

18. The steam turbine of claim 17, wherein said position pick-up of the position of said piston rod includes at least one of a linear displacement transducer in said linear unit and a sensor, said transducer being configured to measure the position of said piston rod in said screw nut, said sensor being configured to detect at least one of speed and position of said rotor of said electromotor.

19. The steam turbine of claim 11, wherein said control unit includes a frequency converter.

20. The steam turbine of claim 11, wherein the electromechanical drive further comprises a spherical bearing fixture connected with the valve to be actuated, said spherical bearing fixture being at a free end of said piston rod.

* * * * *